(12) United States Patent
Robison et al.

(10) Patent No.: US 10,656,936 B2
(45) Date of Patent: May 19, 2020

(54) SYSTEMS AND METHODS FOR SOFTWARE INTEGRITY VALIDATION USING BLOCKCHAIN

(71) Applicant: DELL PRODUCTS L.P., Round Rock, TX (US)

(72) Inventors: Charles D. Robison, Buford, GA (US); Andrew T. Fausak, Coppell, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/117,890

(22) Filed: Aug. 30, 2018

(65) Prior Publication Data
US 2020/0073657 A1    Mar. 5, 2020

(51) Int. Cl.
*G06F 8/71*     (2018.01)
*H04L 9/06*     (2006.01)
*G06F 8/36*     (2018.01)

(52) U.S. Cl.
CPC ............. *G06F 8/71* (2013.01); *G06F 8/36* (2013.01); *H04L 9/0637* (2013.01); *H04L 9/0643* (2013.01); *H04L 2209/38* (2013.01)

(58) Field of Classification Search
CPC . G06F 8/36; G06F 8/71; H04L 9/0637; H04L 9/0643; H04L 2209/38
USPC ........................................................ 717/128
See application file for complete search history.

(56) References Cited

U.S. PATENT DOCUMENTS

| 9,037,648 B2* | 5/2015 | Ogilvie ............... G06F 21/6245 709/204 |
| 9,971,894 B2* | 5/2018 | Shear ....................... G06F 21/45 |
| 2018/0082296 A1* | 3/2018 | Brashers .............. G06Q 20/405 |
| 2018/0189732 A1* | 7/2018 | Kozloski .............. G06Q 10/101 |
| 2018/0260212 A1* | 9/2018 | Wisnovsky ............... G06F 8/71 |
| 2019/0058592 A1* | 2/2019 | Wright ..................... G06N 7/00 |

OTHER PUBLICATIONS

Destefanis et al,. "Smart Contracts Vulnerabilities: A Call for Blockchain Software Engineering?", IEEE, Mar. 2018, 8pg. (Year: 2018).*

(Continued)

*Primary Examiner* — Ryan D. Coyer
(74) *Attorney, Agent, or Firm* — Egan Peterman Enders Huston (57) ABSTRACT

Systems and methods are provided that that may be implemented to track software developer code contributions and their respective revisions. In one exemplary implementation, a distributed ledger may be utilized to track software developer code contributions and their respective revisions. Each code contribution digest, code digest ID, developer public key and previous blockchain block may be compiled for a new block in the blockchain, and the compilation may first be hashed and signed by the private key of the developer. Each developer may have his/her own blockchain that resides within a code repository site and which may also be cached locally on the end user device and used to verify the integrity of the code contribution (e.g., application/service/executable) at the time it is installed on the end user device.

20 Claims, 5 Drawing Sheets

(56) References Cited

OTHER PUBLICATIONS

Ulybyshev et al., "'Blockhub': Blockchain-based Software Development System for Untrusted Environments," IEEE, Jul. 2018, 4pg. (Year: 2018).*

Weber et al., "Untrusted Business Process Monitoring and Execution Using Blockchain," Springer, 2016, 16pg. (Year: 2016).*

Block Geeks, "What Is Blockchain Technology? A Step-by-Step Guide for Beginners", 10 pages, captured from Internet Aug. 29, 2018.

Hoffman, How to Geek, "What Are MD5, SHA-1, and SHA-256 Hashes, and How Do I Check Them?", Feb. 2017, 10 pages.

Lazy Programer's Blog, "Git Revisions Explained", Mar. 2016, 3 pages.

Wikipedia, "Git", Printed from Internet Jun. 13, 2018, 15 pages.

Git Scm, "Git", fast_version_control, Printed from Internet Aug. 13, 2018, Section 7.1 "Revision Selection", 15 pgs.

Microsoft Docs, "Certificates and Public Keys", May 30, 2018, 4 pages.

Microsoft Docs, "Public Key Infrastructure", May 30, 2018, 3 pages.

\* cited by examiner

SYSTEMS AND METHODS FOR SOFTWARE INTEGRITY VALIDATION USING BLOCKCHAIN

FIELD

This invention relates generally to information handling systems and, more particularly, to software integrity validation.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Referenced code and libraries are used as outside resources often brought into other code, algorithms, functions or applications through importing and API calls. DLLs are modular by nature with parts that can be reused by multiple programs and services. Both promote code reuse which streamlines development and can optimize efficient memory usage. However, when these libraries/referenced code segments are imported into compiled applications or referenced by programs, they can be updated, modified or otherwise changed without the underlying software being aware or able to attest to the integrity.

SUMMARY

Disclosed herein are systems and methods that may be implemented to track software developer code contributions and their respective revisions.

Described embodiments may utilize a distributed ledger, such as those instrumented within a public blockchain, to track software developer code contributions and their respective revisions. Each code contribution digest, code digest ID, developer public key and previous blockchain block may be compiled for a new block in the blockchain. However, first the compilation may be hashed and signed by the private key of the developer. In one embodiment, each developer may have his/her own blockchain that resides within a code repository site and which is also cached locally on the end user device and used to verify the integrity of the code contribution (e.g., application/service/executable) at the time it is installed on the end user device.

A blockchain is an immutable public database tied to a code repository. Use of the blockchain as described herein may prevent loading/installing of code contributions that have been tampered with. The blockchain may be cached locally for use offline and updated as available. For example, code digests (e.g., (Application Programming Interfaces (APIs) or Dynamic Link Libraries (DLLs)) may be validated before being loaded by the user device. In particularly sensitive operations, the code sources may be validated in an external source, e.g., in a cloud service, before the code and dependencies are loaded to memory of the local user device.

Embodiments described herein employ developer-signed hashes of code residing within a blockchain in a code repository (e.g., cloud server) and that are cached locally on the user device.

Embodiments described herein may include a loader service (e.g., operating system running on the user device) that validates dependencies before load time and pulls the hash of the code and verifies the signature at the referenced blockchain. More secure implementations may allow for dependency code validation in the cloud first.

Embodiments described herein may also validate all dependencies of code before they are loaded to memory.

In one respect, disclosed herein is a method, including: reading a last block of a blockchain associated with a code developer having a private key and public key pair associated with the blockchain, in which each block of the blockchain includes a signed hash including a hash digest and a signature of the hash digest generated using the private key; hashing a compilation to generate a new hash digest, the compilation including the signed hash of the read last block, the public key and a new code digest; signing the new hash digest with the private key to generate a new signature; and updating the blockchain with a new block that includes a new signed hash including the new hash digest and the new signature.

In another respect, disclosed herein is a method that may be implemented with a code repository that includes: code digests developed by a code developer having a private key paired with a public key, and a blockchain of blocks, the blockchain being associated with the code developer. Each of the code digests may have an associated block of the blockchain that includes a signed hash, each signed hash including a hash digest and a signature of the hash digest; and each hash digest may be a hash of a compilation including the associated code digest, the public key of the code developer, and the signed hash of the previous block of the blockchain. The method may proceed as follows in response to a request to load a code digest of the code digests into a memory of an information handling system: validating, using the public key, the integrity of the signed hash of the block associated with the requested code digest as a prerequisite to performing the request to load the code digest.

In another respect, disclosed herein is an information handling system, including a memory configured to store: a blockchain of blocks associated with a developer having a private key and public key pair associated with the blockchain. Each block of the blockchain may include a signed hash including a hash digest and a signature of the hash digest generated using the private key of the developer, and each hash digest may be a hash of a compilation including a code digest, the public key of the developer of the code digest, and the signed hash of the previous block of the blockchain. The information handling system may also include a processor programmed to: receive a request to load into the memory a code digest having an associated signed hash in the blockchain; and validate, using the public key of the developer of the code digest, the integrity of the associated signed hash as a prerequisite to loading the code digest into the memory.

DESCRIPTION OF ILLUSTRATIVE EMBODIMENTS

Figure 1:
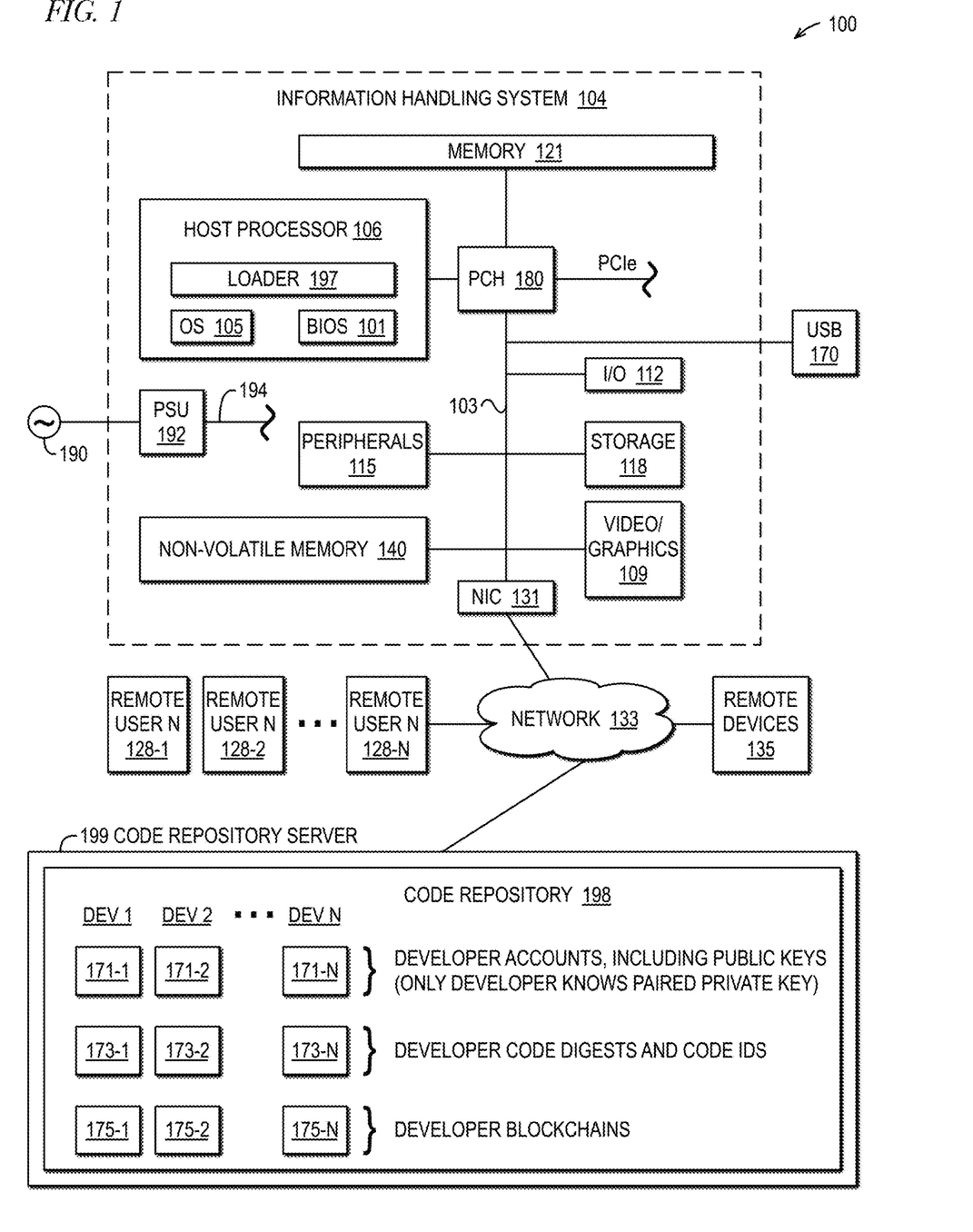
FIG. 1 is a block diagram of system including an information handling system (e.g., a server, desktop computer, laptop, etc.) and a code repository server as they may be configured according to one exemplary embodiment of the disclosed systems and methods.

FIG. 1 is a block diagram of system 100 including an information handling system 104 (e.g., a server, desktop computer, laptop, etc.) and a code repository server 199 as they may be configured according to one exemplary embodiment of the disclosed systems and methods. As shown, system 104 may include one or more host processing device/s 106 (e.g., AMD or Intel-based CPU such as Itanium or any other type of suitable host processing device), one or more buses or communication media 103 (e.g., PCIe bus, USB, SMBus, SATA, other appropriate data buses such as memory bus, etc.), video/graphics hardware 109 (e.g., video adapter or graphics processor unit), storage 118 (e.g., solid state drive (SSD), hard disk drive and/or optical drive, etc.), system memory 121 (e.g., DRAM), local input/output (I/O) 112, peripherals 115 (e.g., keyboard, mouse, etc.), non-volatile memory 140, and remote access controller (RAC) (not shown). Examples of a remote access controller include an integrated Dell Remote Access Controller (iDRAC) available from Dell Technologies, Inc. of Round Rock, Tex., etc.). In the exemplary embodiment of FIG. 1, host processing device/s 106 is configured to load and run a Basic Input Output System (BIOS) 101 (e.g., UEFI firmware), a host OS 105 (e.g., Windows-based OS, Linux-based OS, etc.), and a loader program 197, among others. The video/graphics hardware 109 controls a video display (not shown).

Bus/es 103 provides a mechanism for the various components of system 104 to communicate and couple with one another. As shown, host processing device 106 may be coupled in an embodiment to bus/es 103 via an embedded platform controller hub (PCH) 180 and may be coupled to facilitate input/output functions for the processing device/s 106 with various internal system components of information handling system 104 through bus/es 103 such as PCI, PCIe, SPI, USB, low pin count (LPC), etc. Examples of such system components include, but are not limited to, NVRAM, BIOS SPI Flash, NVDIMMS, DIMMS, PCIe Devices, etc. The PCH 180 is directly coupled to system memory 121 as shown.

In one embodiment, host processing device/s 106 may be an in-band processing device configured to run a host operating system (OS) 105. Besides memory 121 (e.g., random access memory "RAM"), processor 106 may include cache memory for storage of frequently accessed data. Information handling system 104 may also include a network access card (NIC) 131 that is communicatively coupled to network 133 (e.g., Internet or corporate intranet) as shown to allow various components of system 104 to communicate with external and/or remote device/s 135 across network 133, including the code repository server 199. Other external devices, such as an external universal serial bus (USB) device 170 may be coupled to processing device/s 106 via bus/es 103. In this embodiment, information handling system 104 also includes power supply unit (PSU) 192 that is coupled to receive power from AC mains 190 and to perform appropriate power conversion and voltage regulation to produce regulated internal power 194 for use by other power-consuming components of system 104. System 104 may also include a baseboard management controller (BMC) (not shown). As shown, in the embodiment of FIG. 1 the host system 104 may provide access to a plurality of remote users 128-1 through 128-N, although access may be provided to a single user 128 in other embodiments. In this regard, remote users may manage, administer, use, and/or access various resources of host system 104 (e.g., either native or virtual) from a remote location, e.g., via network 133 and/or other suitable communication medium or media.

The code repository server 199 hosts a code repository 198. The code repository 198 stores an account 171, code digests 173, and a blockchain 175 for each of multiple code developers referred to in FIG. 1 as dev 1, dev 2, through dev N. A code developer may be an individual or an organization, e.g., a corporation. A code digest 173 is code that may be used to cause an information handling system (e.g., information handling system 104) to perform information handling operations. The code digests 173 may include binary/executable/machine-readable code (e.g., x86, ARM, or SPARC ISA machine language instructions), source code (e.g., HTML, C, C #, C++, Python, Ruby, FORTRAN, CSS, PHP, Java Script, etc.) or byte code (e.g., Java bytecodes) that must be compiled or interpreted into machine-readable code, or other code. Each code digest 173 has an associated code identifier (code ID). Furthermore, the code digests 173 may include libraries, referenced code, DLLs, called API code, etc. The loader 197 may be executed by the host processor 106 to load a code digest 173 into a memory of the information handling system (e.g., system memory 121, storage 118, non-volatile memory 140, peripherals 115, etc.). Advantageously, the loader 197, or another program, may also be executed to load into information handling system 104 a locally cached version of one or more of the blockchains 175 from the code repository 198 in order to speed up the validation of code digests 173 in embodiments in which the validation is performed by the information handling system 104.

The credentials of each developer account 171 include a public key that is paired to a private key. The private key is known only to the developer, which the developer uses to sign hash digests included in blocks of the developer's blockchain 175. The combination of a hash digest and the cryptographic signature generated for the hash digest using the developer's private key is referred to as a signed hash. Each code digest 173 developed by a developer and stored in the code repository 198 has a corresponding block included in the developer's blockchain 175 that includes the signed hash corresponding to the code digest 173. Advantageously, the signed hash may be used to validate the code digest 173, e.g., by the information handling system 104 or by a remote server (not shown in FIG. 1) that informs the information handling system 104 of the validity of the code digest 173 or lack thereof. Furthermore, each code digest 173 may be a different version/instantiation of similar code (e.g., a different version of the same library, referenced code, DLL, called API code), and each version includes its own block that includes a signed hash generated from the new version of the code digest 173. Advantageously, each time a developer updates or creates a new version of code, the developer's blockchain 175 is updated with a new block having a signed hash associated with the code, i.e., with the new code digest 173. The code digests and code IDs 173, block chains 175, and public keys 171 are made available by the code repository server 199 for downloading, e.g., by the information handling system 104 or remote validating server.

Figure 2:
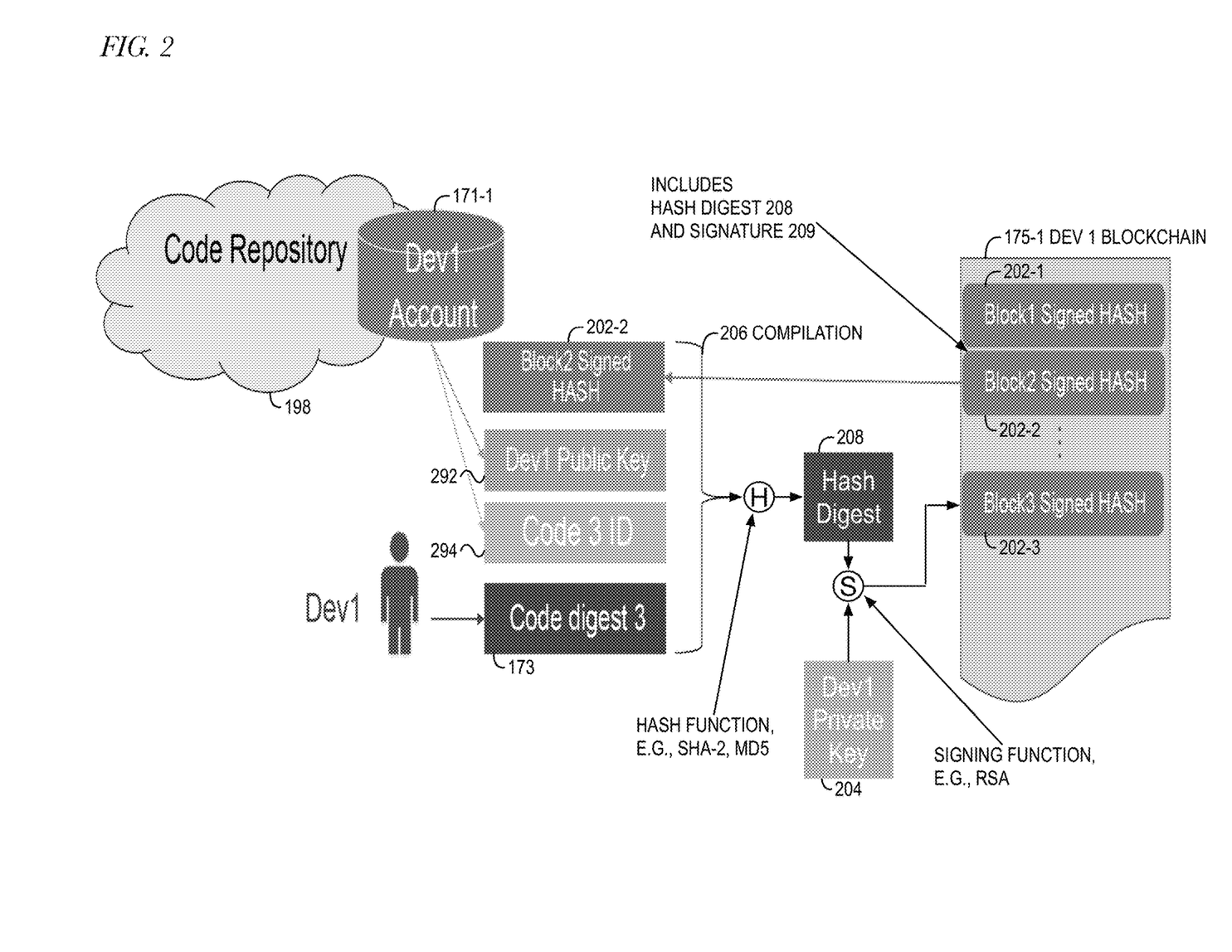
FIG. 2 is a block diagram illustrating creation of a code repository that includes blockchains associated with code developer accounts that may be used to validate/verify code digests stored in the code repository according to one exemplary embodiment of the disclosed systems and methods.

FIG. 2 is a block diagram illustrating creation of a code repository that includes blockchains associated with code developer accounts that may be used to validate/verify code digests stored in the code repository according to one exemplary embodiment of the disclosed systems and methods. The code repository 198 (e.g., of FIG. 1) includes developer accounts 171 (e.g., account 171-1 of developer 1 of FIG. 1) and blockchains (e.g., blockchain 175-1 of developer of FIG. 1). More specifically, FIG. 2 illustrates the process for a developer to check in a new code digest 173. The code digest 173, its code identifier 294 (index assigned to the new code digest 173 within the code repository 198), the developer's public key 292 and the signed hash 202-2 of the last block of the blockchain 175-1 are compiled (e.g., concatenated) into a compilation 206. The compilation 206 is then hashed into a hash digest 208 using a hash function, e.g., SHA-2 (Secure Hash Algorithm 2), MD5, or other cryptographic hash function. The hash digest 208 is then signed using the developer's private key 204 (that is paired with the developer's public key 292 made publicly available by the code repository 198) according to a digital signature algorithm, e.g., RSA or other digital signature algorithm, to generate a digital signature 209. The hash digest 208 and digital signature 209 comprise a signed hash 202-3 that is added in a block to the end of the blockchain 175-1. Contemporaneously, the new code digest 173 is added to the code repository 198 along with the addition of the new block to the developer's blockchain 175-1.

Figure 3:
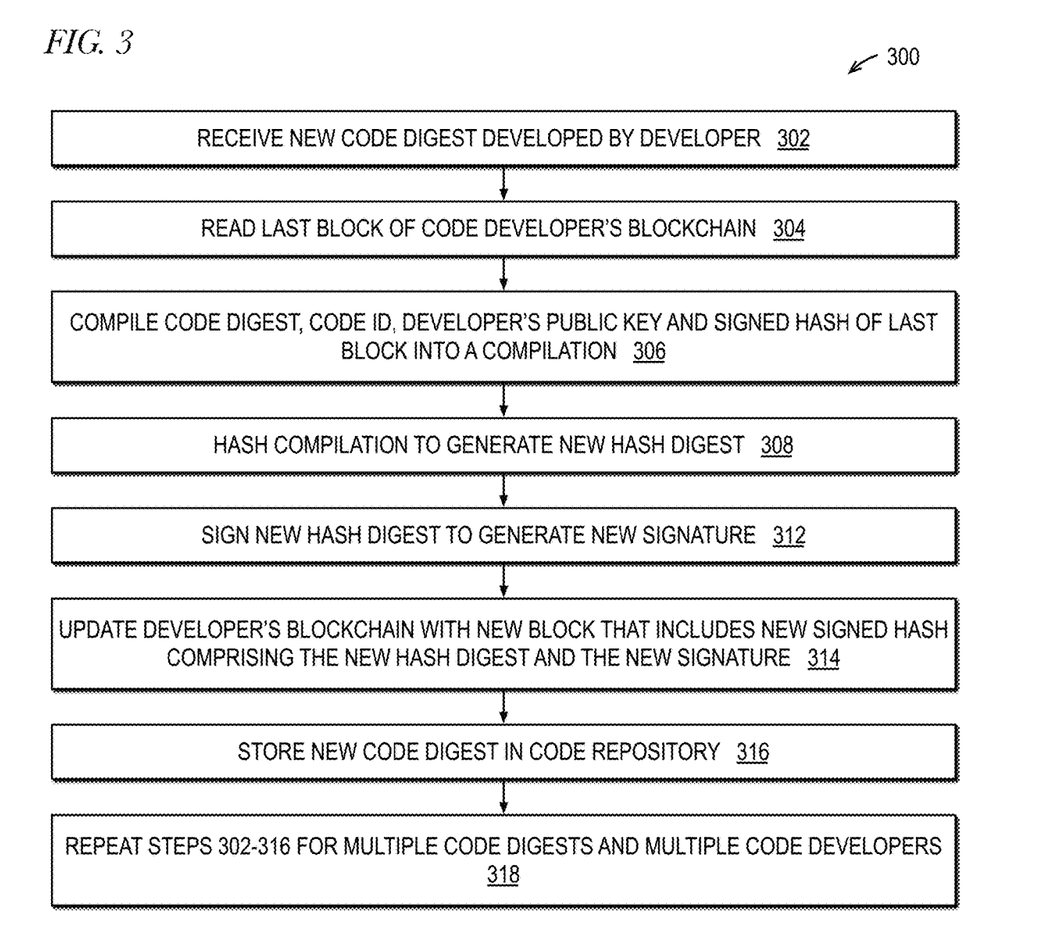
FIG. 3 is a flowchart illustrating creation of a code repository that includes blockchains associated with code developer accounts that may be used to validate/verify code digests stored in the code repository according to one exemplary embodiment of the disclosed systems and methods.

FIG. 3 is a flowchart 300 illustrating creation of a code repository that includes blockchains associated with code developer accounts that may be used to validate/verify code digests stored in the code repository according to one exemplary embodiment of the disclosed systems and methods. In one embodiment, a software program running on the code repository server 199 performs the actions described in FIG. 3. Flow begins at block 302.

At block 302, a developer develops a new code digest, logs into his/her account 171 of the code repository 198 and indicates a request to submit the new code digest to the code repository 198. Flow proceeds to block 304.

At block 304, the code repository 198 reads the last block of the blockchain 175 associated with the developer's account, which includes the signed hash 202 of the last block. Flow proceeds to block 306.

At block 306, the code repository 198 assigns a code ID to the new code digest. The code repository 198 then compiles the new code digest, the code ID (e.g., 294 of FIG. 2), the developer's public key 292, and the signed hash 202 of the last block read at block 304 into a compilation (e.g., 206 of FIG. 2). Flow proceeds to block 308.

At block 308, the code repository 198 hashes the compilation 206 to generate a new hash digest (e.g., 208 of FIG. 2), e.g., using SHA-2, MD5, etc. A hash digest is a numeric representation of its input, and a secure hash algorithm has the property that, for two even slightly different inputs, the hash algorithm will generate entirely different hash digests, i.e., such that the differences of the inputs may not be determined from the differences in the hash digest outputs. Flow proceeds to block 312.

At block 312, the developer signs the new hash digest using his private key (paired with the public key) to generate a new digital signature. Preferably, the code repository 198 prompts the developer for his/her private key, e.g., by insertion of a smart card. Flow proceeds to block 314.

At block 314, the code repository 198 updates the developer's blockchain 175 with the a new block that includes the new signed hash generated at block 312. Flow proceeds to block 316.

At block 316, the code repository 198 stores the new code digest 173 contemporaneously with the storage of the new block into the blockchain 175. Flow proceeds to block 318.

At block 318, the steps described at blocks 302 through 316 may be repeated multiple times for multiple code digests by multiple code developers.

Figure 4:
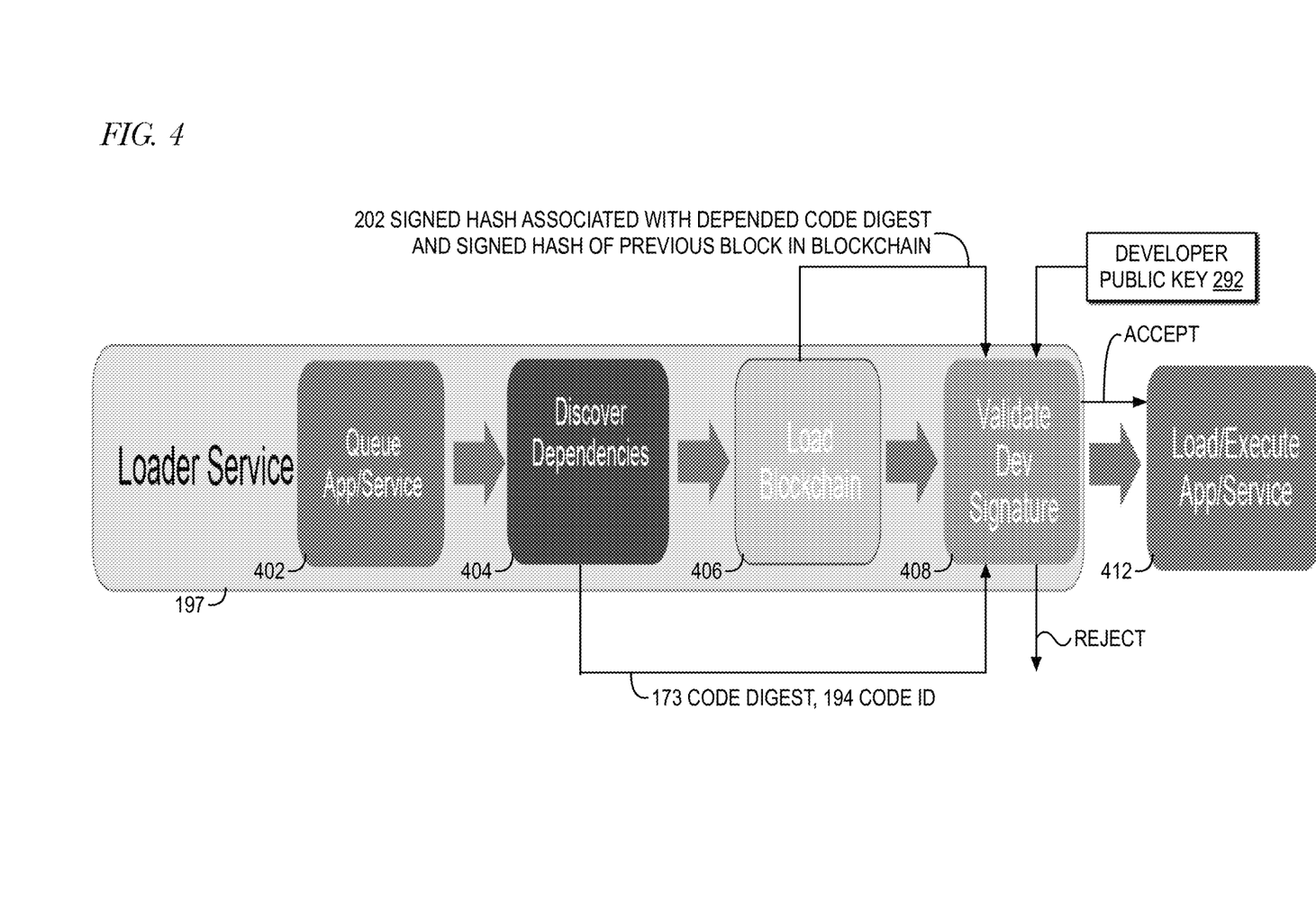
FIG. 4 is a flow diagram illustrating a process for validating/verifying the integrity of a code digest using a blockchain according to one exemplary embodiment of the disclosed systems and methods.

FIG. 4 is a flow diagram illustrating a process for validating/verifying the integrity of a code digest using a blockchain according to one exemplary embodiment of the disclosed systems and methods. Flow begins at block 402.

At block 402, a loader 197 executing on a target information handling system (e.g., information handling system 104 of FIG. 1) receives a request to load an application/service, which is placed into a load queue. For example, an operating system (e.g., OS 105 of FIG. 1) may be requested to load/install the application/service into memory (e.g., system memory 121, storage 118, non-volatile memory 140, peripherals 115, etc.) of the information handling system. Flow proceeds to block 404.

At block 404, the loader 197 discovers that the application/service has a dependency upon a code digest obtained/obtainable from a code repository 198 having a blockchain associated with the depended code digest such that the depended code digest also needs to be loaded into the target information handling system. The dependency may exist in various forms. For example, the application/service may make a call to functions/procedures in a library of the depended code digest. For another example, the application/service may invoke the depended code digest, e.g., executable code. For another example, the application/service may include the depended code digest as source code which may need to be compiled or which may be interpreted along with code in the application/service. Other embodiments are also contemplated in which the depended code digest is referenced by the application/service in other manners. The loader 197 then accesses the depended code digest 173, e.g., a locally stored copy or from the code repository 198, along with the code ID 194 of the depended code digest 173. Additionally, the loader 197 discovers dependencies that the depended code digest 173 may have upon other code digests 173 that have an associated blockchain and accesses these depended code digests and code IDs. In one embodiment, the dependency discovery is performed in a recursive fashion until no more dependencies are discovered. Flow proceeds to block 406.

At block 406, the loader 197 determines the blockchain associated with the discovered depended code digest 173 (i.e., for each depended code digest discovered at block 404) and accesses the relevant blocks of the blockchain 175 associated with the depended code digest. In one embodiment, the blockchain 175 may be cached locally on the information handling system performing the operations described in blocks 404, 406 and 408 of FIG. 4 (e.g., local blockchain database cache 502 of FIG. 5), e.g., the target information handling system or a remote system as described above and below. Flow proceeds to block 408.

At block 408, the loader 197 uses the developer's public key 292 to validate the depended code digest 173 by verifying the signature (e.g., signature 209 of FIG. 2) of the signed hash 202 of the block of the blockchain 175 associated with the depended code digest 173. A digital signature verification algorithm, e.g., RSA, is employed to verify the signature 209, e.g., the signature verification algorithm of the public-key cryptosystem used by the code repository 198 to sign the hash digest 208 associated with the code digest 173. The signature validation/verification process outputs an indication that the signature 209 is either accepted or rejected, i.e., that the signed hash 202 was signed by the private key 204 of the developer whose paired public key 292 is being used to verify the signed hash 202. As an additional verification, the loader 197 may verify the integrity of the code digest 173 by compiling the code digest 173, its code ID 294, the developer's public key 292, and the signed hash 202 of the previous block in the blockchain into a compilation, hash the compilation using the same cryptographic hash function used by the code repository 198 to create the signed hashes of the blockchains, and compare the resulting hash digest with the hash digest of the signed hash of the block of the blockchain associated with the code digest 173 to verify that they match. In one embodiment, the process of FIG. 4 is performed by the target information handling system. Alternatively, the operations described in blocks 404, 406 and 408 of FIG. 4 may be performed by a remote server to which the target information handling system is networked, and the remote system provides the target information handling system with an indication of whether the signature is accepted or rejected and, if accepted, provides the depended code digest 173 to the target information handling system for loading into its memory. Flow proceeds to block 412 if the signature is accepted; otherwise, flow ends.

At block 412, the loader 197 loads the application/service and the depended code digest 173 into its memory and, if applicable, executes the loaded code. Flow ends at block 412.

Figure 5:
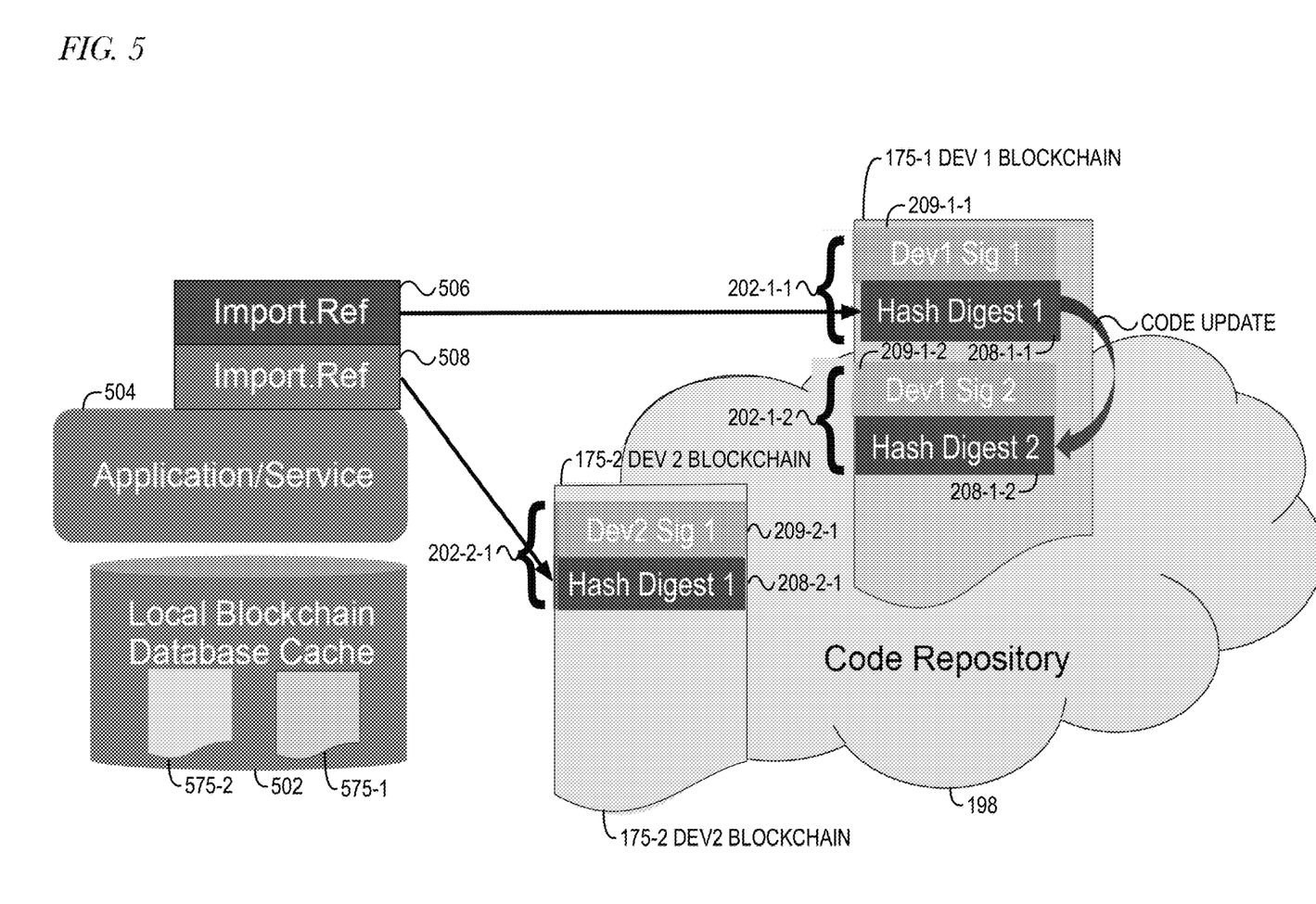
FIG. 5 is a block diagram illustrating a process for updating code in a code repository having blockchains associated with the code developers who develop the code deposited in the code repository to facilitate code integrity validation according to one exemplary embodiment of the disclosed systems and methods.

FIG. 5 is a block diagram illustrating a process for updating code in a code repository having blockchains associated with the code developers who develop the code deposited in the code repository to facilitate code integrity validation according to one exemplary embodiment of the disclosed systems and methods. Various elements of FIG. 5 are similar to those of FIG. 2 and like-numbered elements are similar. The exemplary code repository 198 of FIG. 5 includes a first blockchain 175-1 associated with developer 1 and a second blockchain 175-2 associated with developer 2. The second blockchain 175-2 has a single signed hash 202-2-1 comprising a hash digest 208-2-1 and an associated signature 209-2-1. The first blockchain 175-1 has a first signed hash 202-1-1 comprising a hash digest 208-1-1 and an associated signature 209-1-1 and a second signed hash 202-1-2 comprising a hash digest 208-1-2 and an associated signature 209-1-2. As shown in the first blockchain 175-1, the second hash digest 208-1-2 reflects a code update relative to the first hash digest 208-1-1, i.e., implies the code digest 173 associated with the second hash digest 208-1-2 is a new revision of the code digest 173 associated with the first hash digest 208-1-1. In contrast, developer 2 has not updated the code digest 173 associated with the signed hash 202-2-1 in the second blockchain 175-2.

FIG. 5 also includes a local blockchain database cache 502 that may be stored on an information handling system programmed to perform the code integrity validation process according to embodiments described herein. The blockchain cache 502 includes a locally cache copy 575-2 of the developer 2 blockchain 175-2 and a locally cached copy 175-1 of the developer 1 blockchain 175-1.

FIG. 5 also includes an application/service 504 that is requested to be loaded onto a target information handling system (e.g., as described with respect to FIG. 4 above). The application/service 504 includes a first import reference 508 to import a code digest 173 developed by developer 2 and having a signed hash 202-2-1 stored in developer 2's blockchain 175-2, as shown. The application/service 504 includes a second import reference 506 to import a code digest 173 developed by developer 1 and having a signed hash 202-1-1 stored in developer 1's blockchain 175-1, as shown. In one embodiment, the loader 197 (e.g., of FIG. 1 and/or FIG. 4) detects the version update of the code digest 173 associated with the second import reference 506 and performs an integrity validation of the updated version of the code digest 173 using developer 1's blockchain 175-1, similar to the manner described above with respect to FIG. 4, and if the integrity of the updated code digest 173 is validated, then the updated code version is loaded into the target information handling system memory, rather than the prior version. In one embodiment, a user of the target information handling system is prompted to confirm a desire to load the updated version. In one embodiment, the loader 197 may include an option to either provide the confirmation prompt or to automatically load the updated code version if its integrity is successfully validated.

It will be understood that the embodiment of FIG. 1 is exemplary only, and that an information handling system may be provided with one or more processing devices that may perform the functions of host processing device/s 106, etc. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 1 is exemplary only, and that other information handling system architectures may be employed in the practice of the disclosed systems and methods.

It will be understood that the steps of FIGS. 3 and 4 are exemplary only, and that any combination of fewer, additional and/or alternative steps may be employed that are suitable for creating a blockchain-based code repository or for using a blockchain-based code repository to validate the integrity of code stored therein.

It will be understood that one or more of the tasks, functions, or methodologies described herein (e.g., including those described herein for components 104, 106, 199, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the scope of the invention as defined by the appended claims. Moreover, the different aspects of the disclosed methods and systems may be utilized in various combinations and/or independently. Thus, the invention is not limited to only those combinations shown herein, but rather may include other combinations.

What is claimed is:

1. A method, comprising:
   reading a last block of a blockchain associated with a code developer having a private key and public key pair associated with the blockchain;
   wherein each block of the blockchain includes a signed hash comprising a hash digest and a signature of the hash digest generated using the private key;
   hashing a compilation to generate a new hash digest, the compilation comprising the signed hash of the read last block, the public key and a new code digest;
   signing the new hash digest with the private key to generate a new signature; and
   creating an updated blockchain without the new code digest by updating the blockchain with a new block that includes the new signed hash comprising the new hash digest and the new signature.

2. The method of claim 1,
   wherein the compilation further comprises an identifier of the code digest.

3. The method of claim 1, further comprising:
   where the blockchain is stored in a code repository at which the code developer has an account; and
   wherein code digests from which the signed hashes of the blockchain are created are stored separately and apart from the blockchain in the code repository and are retrievable from the code repository.

4. The method of claim 3, further comprising:
   storing the new code digest in the code repository separate and apart from the blockchain contemporaneously with said updating the blockchain.

5. The method of claim 1, further comprising:
   creating a code repository comprising:
      a plurality of sets of code digests developed by a plurality of code developers each having an associated private key and public key pair; and
      a plurality of blockchains corresponding to the plurality of code developers, the blockchains being stored in the code repository separate and apart from the code digests; and
   wherein each block of the plurality of blockchains is created by performing said reading, said hashing, said signing and said updating.

6. A method, comprising:
   wherein a code repository comprises:
      code digests developed by a code developer having a private key paired with a public key; and
      a blockchain of blocks not including the code digests, wherein the blockchain is associated with the code developer;
   wherein each of the code digests has an associated block of the blockchain that includes a signed hash, wherein each signed hash comprises a hash digest and a signature of the hash digest;
   wherein each hash digest is a hash of a compilation comprising the associated code digest, the public key of the code developer, and the signed hash of the previous block of the blockchain; and in response to a request to load a code digest of the code digests into a memory of an information handling system:
  validating, using the public key, the integrity of the signed hash of the block associated with the requested code digest as a prerequisite to performing the request to load the code digest.

7. The method of claim 6, further comprising:
discovering a second code digest upon which the requested code digest depends; and
validating the integrity of the signed hash of the block associated with the second code digest as a prerequisite to performing the request to load the code digest.

8. The method of claim 6, further comprising:
wherein the code repository is stored on a second information handling system networked to the first information handling system; and
caching locally on the first information handling system the blockchain associated with the code developer prior to receiving the request to load the code digest into the memory.

9. The method of claim 6,
wherein the compilation further comprises an identifier of the associated code digest.

10. The method of claim 6,
wherein said validating is performed on a second information handling system networked to the first information handling system and that notifies the first information handling system whether the integrity of the associated signed hash has been validated.

11. The method of claim 6,
wherein said validating is performed additionally using the signed hash of the block of the blockchain previous to the block associated with the requested code digest.

12. The method of claim 6, further comprising:
hashing a compilation of the requested code digest, the public key, and the signed hash of the block of the blockchain previous to the block associated with the requested code digest to generate a second hash digest; and
verifying that the second hash digest matches the hash digest of the signed hash of the block associated with the requested code digest as an additional prerequisite to performing the request to load the code digest.

13. The method of claim 6, further comprising:
wherein the requested code digest is from a list comprising:
  a dynamic link library (DLL);
  a referenced code segment;
  a code library; and
  code called by application programming interface (API).

14. An information handling system, comprising:
a memory configured to store:
  a blockchain of blocks associated with a developer having a private key and public key pair associated with the blockchain,
  wherein each block of the blockchain includes a signed hash comprising a hash digest and a signature of the hash digest generated using the private key of the developer, and
  wherein each hash digest is a hash of a compilation comprising a code digest, the public key of the developer of the code digest, and the signed hash of the previous block of the blockchain, the blockchain not including the code digest; and
a programmable integrated circuit programmed to:
  receive a request to load into the memory a code digest having an associated signed hash in the blockchain; and
  validate, using the public key of the developer of the code digest, the integrity of the associated signed hash as a prerequisite to loading the code digest into the memory.

15. The information handling system of claim 14,
wherein the programmable integrated circuit is further programmed to:
  discover a second code digest upon which the requested code digest depends; and
  validate the integrity of the signed hash of the block associated with the second code digest as a prerequisite to performing the request to load the code digest.

16. The information handling system of claim 14,
wherein the code repository is stored on a second information handling system networked to the first information handling system; and
wherein the programmable integrated circuit is further programmed to:
  cache locally on the first information handling system the blockchain associated with the code developer prior to receiving the request to load the code digest into the memory.

17. The information handling system of claim 14,
wherein the compilation further comprises an identifier of the associated code digest.

18. The information handling system of claim 14,
wherein a second information handling system networked to the first information handling system validates the integrity of the associated signed hash and notifies the first information handling system whether the integrity of the associated signed hash has been validated.

19. The information handling system of claim 14,
wherein the signed hash of the block of the blockchain previous to the block associated with the requested code digest is additionally used to validate the integrity of the associated signed hash.

20. The information handling system of claim 14, further comprising:
wherein the programmable integrated circuit is further programmed to:
  hash a compilation of the requested code digest, the public key, and the signed hash of the block of the blockchain previous to the block associated with the requested code digest to generate a second hash digest; and
  verify that the second hash digest matches the hash digest of the signed hash of the block associated with the requested code digest as an additional prerequisite to performing the request to load the code digest.

* * * * *